United States Patent
Viering et al.

(10) Patent No.: US 12,551,095 B2
(45) Date of Patent: Feb. 17, 2026

(54) MEDICAL ILLUMINATION SYSTEMS AND METHODS OF USING THE SAME

(71) Applicant: Boston Scientific Scimed, Inc., Maple Grove, MN (US)

(72) Inventors: Kirsten Viering, Newton, MA (US); Louis J. Barbato, Franklin, MA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 790 days.

(21) Appl. No.: 17/863,229

(22) Filed: Jul. 12, 2022

(65) Prior Publication Data

US 2023/0024979 A1 Jan. 26, 2023

Related U.S. Application Data

(60) Provisional application No. 63/221,361, filed on Jul. 13, 2021.

(51) Int. Cl.
| | |
|---|---|
| *A61B 1/06* | (2006.01) |
| *A61B 1/00* | (2006.01) |
| *A61B 1/05* | (2006.01) |
| *G06V 10/147* | (2022.01) |
| *G06V 10/60* | (2022.01) |

(52) U.S. Cl.
CPC ............ *A61B 1/06* (2013.01); *A61B 1/00009* (2013.01); *A61B 1/05* (2013.01); *G06V 10/147* (2022.01); *G06V 10/60* (2022.01)

(58) Field of Classification Search
None
See application file for complete search history.

(56) References Cited

U.S. PATENT DOCUMENTS

| | | | |
|---|---|---|---|
| 10,863,885 B2 | 12/2020 | Tamiya | |
| 2011/0071353 A1* | 3/2011 | Ozawa | A61B 1/0653 600/109 |
| 2015/0005575 A1* | 1/2015 | Kobayashi | A61B 1/045 600/103 |
| 2015/0092035 A1 | 4/2015 | Yamamoto et al. | |

OTHER PUBLICATIONS

International Search Report and Written Opinion issued in International Application No. PCT/2022/036855, issued Oct. 7, 2022 (11 pages).

* cited by examiner

*Primary Examiner* — Tessa M Matthews
(74) *Attorney, Agent, or Firm* — Bookoff McAndrews, PLLC

(57) ABSTRACT

A medical system that includes a shaft having a distal end configured to be positioned at a target site, a first light and a second light positioned at the distal end, and a computing device communicatively coupled to the first and second light. The computing device includes a processor and non-transitory computer readable medium storing instructions that, when executed by the processor, causes the processor to determine a first illumination measurement of a first region of the target site by the first light and a second illumination measurement of a second region of the target site by the second light. The second region is different than the first region. The processor adjusts emittance from the first light, in response to the first illumination measurement being different than a first threshold, and emittance from the second light in response to the second illumination measurement being different than a second threshold.

20 Claims, 5 Drawing Sheets

MEDICAL ILLUMINATION SYSTEMS AND METHODS OF USING THE SAME

CROSS-REFERENCE TO RELATED APPLICATIONS

This application claims the benefit of priority of U.S. Provisional Patent Application No. 63/221,361, filed Jul. 13, 2021, the entirety of which is incorporated herein by reference.

TECHNICAL FIELD

Various aspects of the disclosure relate generally to medical illumination instruments, systems, devices, and related methods. More specifically, examples of the disclosure relate to instruments, systems, devices, and related methods for enhancing a visibility of one or more target sites within a patient during an endoscopic procedure, among other aspects.

BACKGROUND

Technological developments have given users of medical systems, devices, and methods, the ability to conduct increasingly complex procedures on subjects. One challenge in the field of minimally invasive surgeries such as endoscopy, among other surgical procedures, is associated with providing sufficient visibility to a physician seeking to locate a target treatment site within a patient using an imaging device. Illumination of the target treatment site using one or more lighting devices may provide limited optical visibility within the patient to adequately conduct an examination and diagnostic analysis of the target site. This may generally be due to the varying anatomical profiles of each target treatment site, which may require an application of light that is tailored to the target anatomy under observation. The limitations of medical devices in providing adequate illumination of a target site may prolong the procedure, limit its effectiveness, and/or cause injury to the patient due to lack of visibility.

SUMMARY

Aspects of the disclosure relate to, among other things, systems, devices, instruments, and methods for illuminating target treatment sites based on automatically controlling an illumination beam profile to emit within the target anatomy under observation, among other aspects. Each of the aspects disclosed herein may include one or more of the features described in connection with any of the other disclosed aspects.

According to an example, a medical system may include a shaft having a distal end configured to be positioned at a target site; a first light positioned at the distal end; a second light positioned at the distal end; and a computing device communicatively coupled to the first light and the second light, wherein the computing device includes a processor and non-transitory computer readable medium storing instructions that, when executed by the processor, causes the processor to: (i) determine a first illumination measurement of a first region of the target site by the first light; (ii) determine a second illumination measurement of a second region of the target site by the second light, wherein the second region is different than the first region; (iii) adjust emittance from the first light in response to the first illumination measurement of the first region being different than a first threshold; and (iv) adjust emittance from the second light in response to the second illumination measurement of the second region being different than a second threshold.

Any of the medical systems described herein may include any of the following features. The instructions stored in the non-transitory computer readable medium causes the processor to: increase the emittance from the first light when the first illumination measurement of the first region is less than the first threshold, and decrease the emittance from the first light when the first illumination measurement of the first region is greater than the first threshold. The instructions stored in the non-transitory computer readable medium causes the processor to: increase the emittance from the second light when the second illumination measurement of the second region is less than the second threshold, and decrease the emittance from the second light when the second illumination measurement of the second region is greater than the second threshold. Further including an imaging device positioned at the distal end, the imaging device configured to capture image data of the first region and the second region of the target site. The computing device is communicatively coupled to the imaging device, and the instructions stored in the non-transitory computer readable medium causes the processor to: determine a first location of the first region of the target site and a second location of the second region of the target site relative to the distal end based on the image data captured by the imaging device. The instructions stored in the non-transitory computer readable medium causes the processor to: determine the first illumination measurement of the first region based on the image data captured by the imaging device at the first location; and determine the second illumination measurement of the second region based on the image data captured by the imaging device at the second location. The instructions stored in the non-transitory computer readable medium causes the processor to: determine the first illumination measurement of the first region by calculating an average brightness of a plurality of pixels from the image data captured by the imaging device. The instructions stored in the non-transitory computer readable medium causes the processor to: adjust the first illumination measurement of the first region based on a first cross-term parameter indicative of illumination of the first region by the second light; and adjust the second illumination measurement of the second region based on a second cross-term parameter indicative of illumination of the second region by the first light. Each of the first and second cross-term parameters include a predefined variable stored on the computing device. Each of the first and second cross-term parameters include a dynamic variable that is automatically adjusted by the computing device based on the image data captured by the imaging device. The instructions stored in the non-transitory computer readable medium cause the processor to: modify each of the first and second cross-term parameters based on a frequency distribution of a plurality of pixels from the image data captured by the imaging device. The instructions stored in the non-transitory computer readable medium cause the processor to: periodically determine the first illumination measurement of the first region and the second illumination measurement of the second region with the imaging device after adjusting emittance from the first light and the second light. The instructions stored in the non-transitory computer readable medium cause the processor to: determine an area of the first region and an area of the second region of the target site based on the image data captured by the imaging device. The instructions stored in the non-transitory computer readable medium cause the processor to: determine the first illumination measurement of the first region by the first light and the second light at least partially based on the area of the first region; and determine the second illumination measurement of the second region by the second light and the first light at least partially based on the area of the second region. The first light is configured to generate a broad beam profile and the second light is configured to generate a narrow beam profile, such that the second region includes a central area of the target site relative to the distal end and the first region includes a periphery area of the target site surrounding the central area.

According to another example, a method of illuminating a target site with a medical system may include determining a first location of a first region and a second location of a second region of the target site relative to the medical system; determining a first illumination measurement of the first region by a first light of the medical system; determining a second illumination measurement of the second region by a second light of the medical system, the second region being different than the first region; and adjusting emittance of one or more of the first light or the second light in response to the first illumination measurement or the second illumination measurement varying from a threshold.

Any of the methods described herein may include any of the following steps. Capturing image data of the target site with an imaging device of the medical system, such that determining the first location of the first region and the second location of the second region is based on the image data captured by the imaging device. Capturing image data of the target site with an imaging device of the medical system, such that determining the first illumination measurement and the second illumination measurement is based on the image data captured by the imaging device. Adjusting the first illumination measurement and the second illumination measurement based on a cross parameter indicative of illumination of an opposing region of the target site by the corresponding first light or second light.

According to a further example, a method of illuminating a target site with a medical system may include (a) capturing image data of the target site with an imaging device of the medical system; (b) determining a location of a first region and a location of a second region of the target site relative to the medical system; (c) determining a size of the first region and a size of the second region based on the image data; (d) determining a first illumination measurement of the first region by a first light of the medical system based on the location and the size of the first region; (e) determining a second illumination measurement of the second region by a second light of the medical system based on the location and the size of the second region; (f) comparing each of the first illumination measurement and the second illumination measurement to a respective threshold; (g) adjusting emittance of one or more of the first light or the second light in response to the respective first illumination measurement or the second illumination measurement varying from the threshold; and (h) repeating steps (a) through (g) at a periodic interval until the first illumination measurement and the second illumination measurement is determined to equal the threshold at step (f).

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary aspects of the disclosure and together with the description, serve to explain the principles of the disclosure.

DETAILED DESCRIPTION

Figure 1:
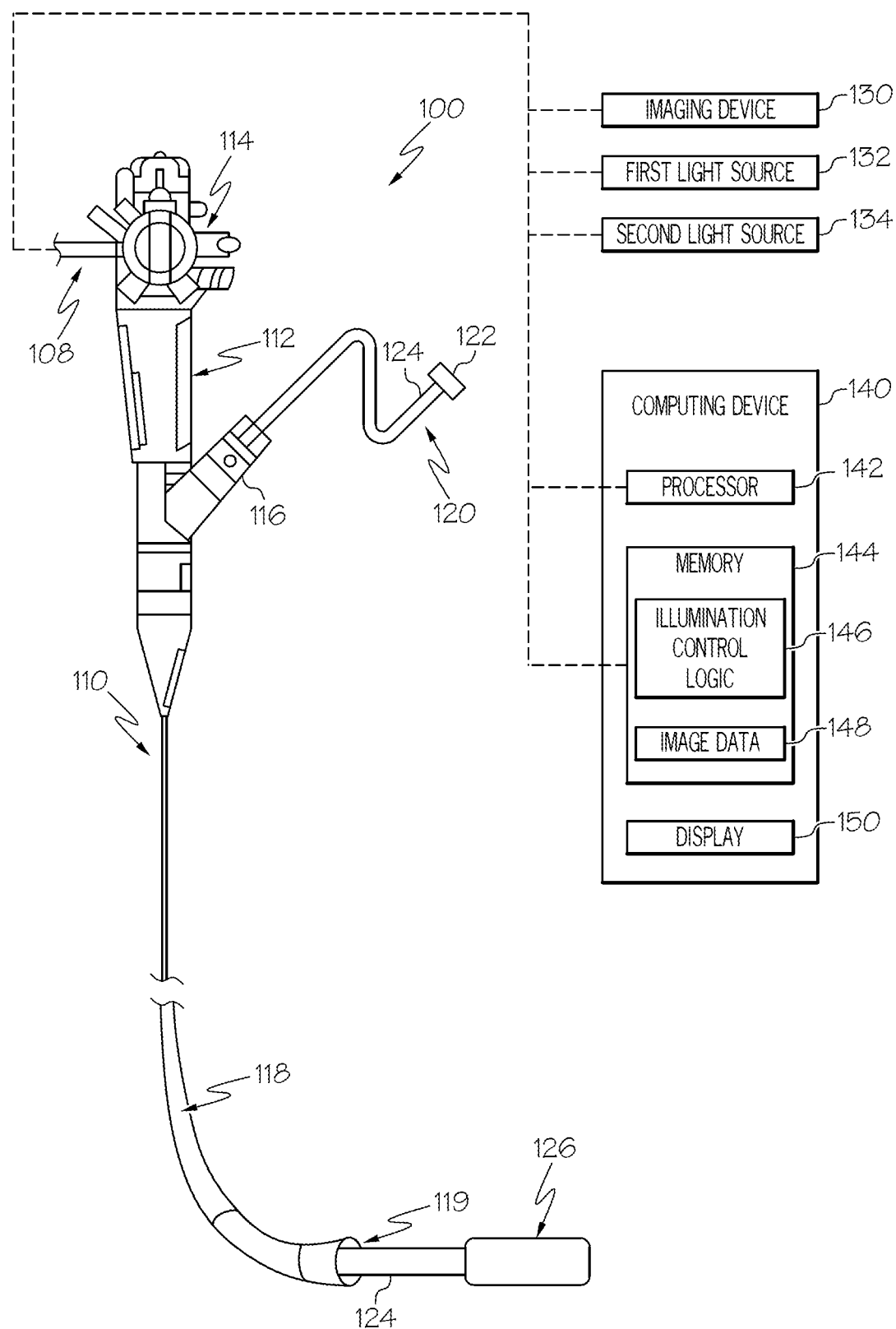
FIG. 1 is a schematic view of an exemplary medical system, according to aspects of this disclosure.

Examples of the disclosure include systems, devices, and methods for facilitating illumination of one or more target treatment sites within a subject (e.g., patient) based on an anatomical profile of the site. Reference will now be made in detail to aspects of the disclosure, examples of which are illustrated in the accompanying drawings. Wherever possible, the same or similar reference numbers will be used through the drawings to refer to the same or like parts. The term "distal" refers to a portion farthest away from a user when introducing a device into a patient. By contrast, the term "proximal" refers to a portion closest to the user when placing the device into the subject. As used herein, the terms "comprises," "comprising," or any other variation thereof, are intended to cover a non-exclusive inclusion, such that a process, method, article, or apparatus that comprises a list of elements does not necessarily include only those elements, but may include other elements not expressly listed or inherent to such process, method, article, or apparatus. The term "exemplary" is used in the sense of "example," rather than "ideal." As used herein, the terms "about," "substantially," and "approximately," indicate a range of values within +/−10% of a stated value.

Examples of the disclosure may be used to illuminate a target site with a medical system, such as, for example, a medical system including a computing device capable of executing illumination control logic. For example, a target site may include various spatial regions relative to the medical instrument received therein, such as a first center region and a second, periphery region surrounding the center region. A computing device of the medical system may execute one or more logic operations to illuminate the various spatial regions of the target site to provide sufficient lighting and facilitate treatment operations at the target site. The illumination control logic of the medical system may determine a relative illumination of each spatial region to detect and/or measure real-time visibility within the target site to determine whether sufficient visibility is present to allow for an optical examination of the area.

Examples of the disclosure may relate to devices and methods for performing various medical procedures and/or treating portions of the large intestine (colon), small intestine, cecum, esophagus, any other portion of the gastrointestinal tract, and/or any other suitable patient anatomy (collectively referred to herein as a "target treatment site"). This disclosure, however, is not limited to any particular anatomical region, and may be used in ureteroscopy, bronchoscopy, colonoscopy, endoscopy, etc., and/or diagnosis or treatment of any bodily lumen. Various examples described herein include single-use or disposable medical devices. Reference will now be made in detail to examples of the disclosure described above and illustrated in the accompanying drawings. Wherever possible, the same reference numbers will be used throughout the drawings to refer to the same or like parts.

FIG. 1 shows a schematic depiction of an exemplary medical system 100 in accordance with an example of this disclosure. Medical system 100 may include a medical device 110, a medical instrument 120, an imaging device 130, a first light source 132, a second light source 134, and a computing device 140. Computing device 140 may be communicatively coupled to medical device 110 by, for example, a wired connection, a wireless connection, and the like. In examples, computing device 140 may include a computer system incorporating a plurality of hardware components that allow computing device 140 to receive and monitor data (e.g., image data 148), initiate transmission of light (e.g., from first light source 132 and/or second light source 134), and/or process other information described herein. Illustrative hardware components of computing device 140 may include at least one processor 142, at least one memory 144, and at least one display 150.

Processor 142 of computing device 140 may include any computing device capable of executing machine-readable instructions, which may be stored on a non-transitory computer-readable medium, such as, for example, memory 144 of computing device 140. By way of example, processor 142 may include a controller, an integrated circuit, a microchip, a computer, and/or any other computer processing unit operable to perform calculations and logic operations required to execute a program. As described in greater detail herein, processor 142 may be configured to perform one or more operations in accordance with the instructions stored on memory 144, such as, for example, an illumination control logic 146, and the like.

Still referring to FIG. 1, memory 144 may include a non-transitory computer readable medium that stores machine-readable instructions thereon, such as, for example, illumination control logic 146. As described in further detail below, illumination control logic 146 may include executable instructions that allow medical system 100 to detect and/or measure an optical visibility of a target site to determine whether the target site requires an enhanced emittance of illumination from light sources 132, 134 to facilitate an optical examination and treatment of the target site by medical device 110 and medical instrument 120. Further, illumination control logic 146 may include executable instructions that determine the illumination requirements based on an anatomical profile of the target treatment site, such that control of light sources 132, 134 is automated in real-time based on current conditions within the target site.

It should be appreciated that illumination control logic 146 may execute periodic or continuous visibility assessments of the target site automatically without requiring user input. In other embodiments, computing device 140 may be configured to receive user inputs to initiate illumination assessments of the target site, such as, for example, from a user input in communication (e.g., wireless, wired, etc.) with computing device 140 via display 150. In the embodiment, display 150 may include a user interface configured and operable to generate a graphical display of information and receive user inputs for transmitting commands to processor 142. For example, display 150 may include a touchscreen interface display.

It should be understood that various programming algorithms and data that support an operation of medical device 110 may reside in whole or in part in memory 144. Memory 144 may include any type of computer readable medium suitable for storing data and algorithms, such as, for example, random access memory (RAM), read only memory (ROM), a flash memory, a hard drive, and/or any device capable of storing machine-readable instructions. Memory 144 may include one or more data sets, including, but not limited to, diagnostic data from one or more components of medical system 100 (e.g., medical device 110, medical instrument 120, imaging device 130, etc.). In the example, memory 144 may receive and store image data 148 of a target treatment site as recorded by imaging device 130 during use of medical system 100 in a procedure.

Still referring to FIG. 1, medical device 110 may be configured to facilitate positioning of one or more components of medical system 100 relative to a subject (e.g., a patient), such as, for example, medical instrument 120. In embodiments, medical device 110 may be any type of endoscope, duodenoscope, gastroscope, colonoscope, ureteroscope, bronchoscope, catheter, or other instrument for providing light and imaging capabilities. Medical device 110 may include a handle 112, an actuation mechanism 114, at least one port 116, and a shaft 118. Handle 112 may have one or more lumens (not shown) that communicate with a lumen(s) of one or more other components of medical system 100. Handle 112 may include the at least one port 116 that opens into the one or more lumens of medical device 110. As described in further detail herein, the at least one port 116 is sized and shaped to receive one or more devices therethrough, such as, for example, medical instrument 120.

Medical system 100 may further include an umbilicus assembly 108 coupled to medical device 110 via at least one port along handle 112. Umbilicus assembly 108 may be configured to facilitate connection between medical device 110 and one or more devices of medical system 100. Umbilicus assembly 108 may include an umbilicus tube having a first end coupled to medical device 110 and a second (opposite) end including a plurality of connections (e.g. electrical, fluid, etc.). In the example, umbilicus assembly 108 may be configured to connect to and/or receive one or more electronic cables, wires, etc. from the one or more devices (e.g., imaging device 130, first light source 132, second light source 134, computing device 140, etc.). The electronic cables and/or wires from the one or more devices may be received through handle 112 and into shaft 118 (e.g., via one or more respective lumens). In other embodiments, one or more of first light source 132 and/or second light source 134 may be positioned within shaft 118, such as at a distal end 119.

Figure 3:
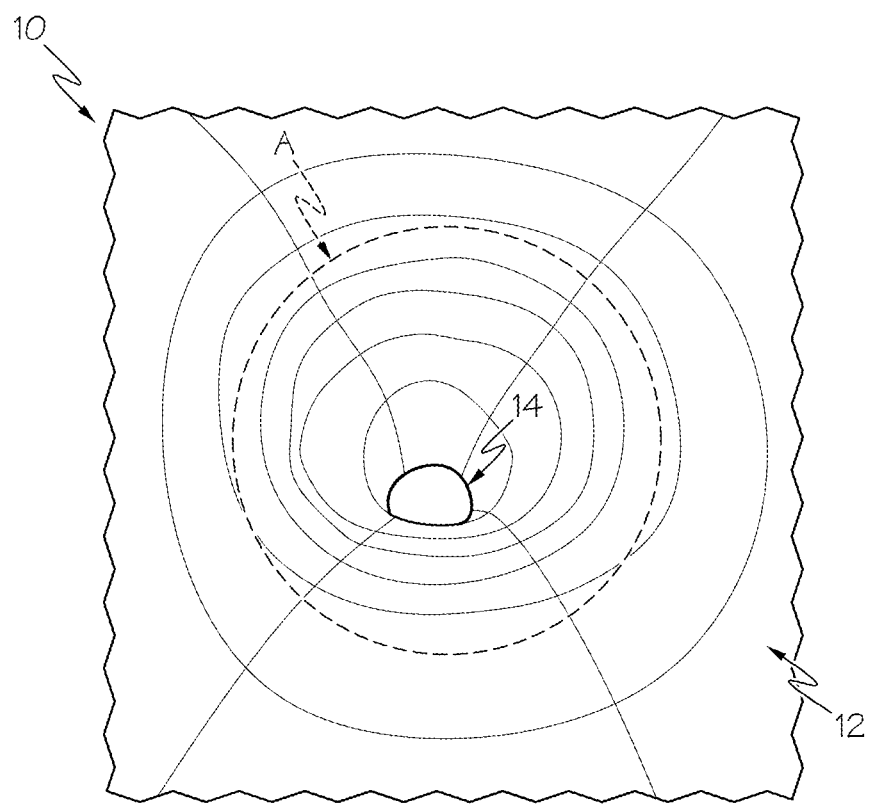
FIG. 3 is a schematic view of an image received by the medical system of FIG. 1 positioned at the target site of a patient, according to aspects of this disclosure.

Shaft 118 may include a tube that is sufficiently flexible such that shaft 118 is configured to selectively bend, rotate, and/or twist when being inserted into and/or through a subject's tortuous anatomy to a target treatment site. Shaft 118 may have one or more lumens (not shown) extending therethrough that include, for example, a working lumen 117 (FIG. 3) for receiving devices (e.g., medical instrument 120). In other examples, shaft 118 may include additional lumens such as a control wire lumen for receiving one or more control wires for actuating one or more distal parts/tools (e.g., an articulation joint, an elevator, etc.), a fluid lumen for delivering a fluid, one or more illumination lumens for receiving a first light 133 communicatively coupled to first light source 132 and a second light 135 communicatively coupled to second light source 134, and/or an imaging lumen for receiving an imaging sensor 131 of imaging device 130 (FIG. 3). First light 133 and second light 135 may include, but are not limited to, an optical fiber, an LED, and/or various other suitable imaging devices. Imaging sensor 131 may include, but is not limited to, a charge-coupled device (CCD), a CMOS, and/or various other suitable camera sensors.

Still referring to FIG. 1, shaft 118 may further include distal end 119. Distal end 119 may include one or more openings that are in communication with the one or more lumens of shaft 118. For example, distal end 119 may include a working opening through which medical instrument 120 may exit from shaft 118. In other examples, distal end 119 may include additional and/or fewer openings, such as, for example, a fluid opening or nozzle through which fluid may be emitted from a fluid lumen of shaft 118, an illumination opening/window(s) through which first light 133 and second light 135 may be emitted, and/or an imaging opening/window through which imaging sensor 131 may be used to generate an image. Actuation mechanism 114 may be positioned on handle 112, and may include one or more knobs, buttons, levers, switches, and/or other suitable actuators. Actuation mechanism 114 may be configured to control at least one of a deflection of shaft 118 (e.g., through actuation of a control wire), delivery of a fluid, emission of illumination (e.g., from first light source 132 and/or second light source 134), and/or various imaging functions (e.g., via imaging device 130).

Still referring to FIG. 1, medical instrument 120 may include a catheter having a longitudinal body 124 defined between a proximal end and a distal end 126. Longitudinal body 124 may be flexible such that medical instrument 120 may be configured to bend, rotate, and/or twist when being inserted into a working lumen of medical device 110. The proximal end of medical instrument 120 may include a handle 122 configured to move, rotate, and/or bend longitudinal body 124. Further, handle 122 may define one or more ports (not shown) sized to receive one or more tools through longitudinal body 124 of medical instrument 120. Alternatively, distal end 126 of medical instrument 120 may include an end effector, such as cutting or grasping forceps, a biopsy device, a snare loop, an injection needle, a cutting blade, scissors, a retractable basket, a retrieval device, an ablation and/or electrophysiology tool, a stent placement device, a surgical stapling device, a balloon catheter, a laser-emitting device, and/or any other suitable diagnostic therapeutic end effector.

Medical device 110 may be configured to receive medical instrument 120 via the at least one port 116, through shaft 118 via a working lumen, and to the working opening at distal end 119. In this instance, medical instrument 120 may extend distally out of the working opening and into a surrounding environment of distal end 119, such as, for example, at a target treatment site of a subject. Distal end 126 may extend distally from the working opening of shaft 118 in response to a translation of longitudinal body 124 through the working lumen of shaft 118.

Figure 2:
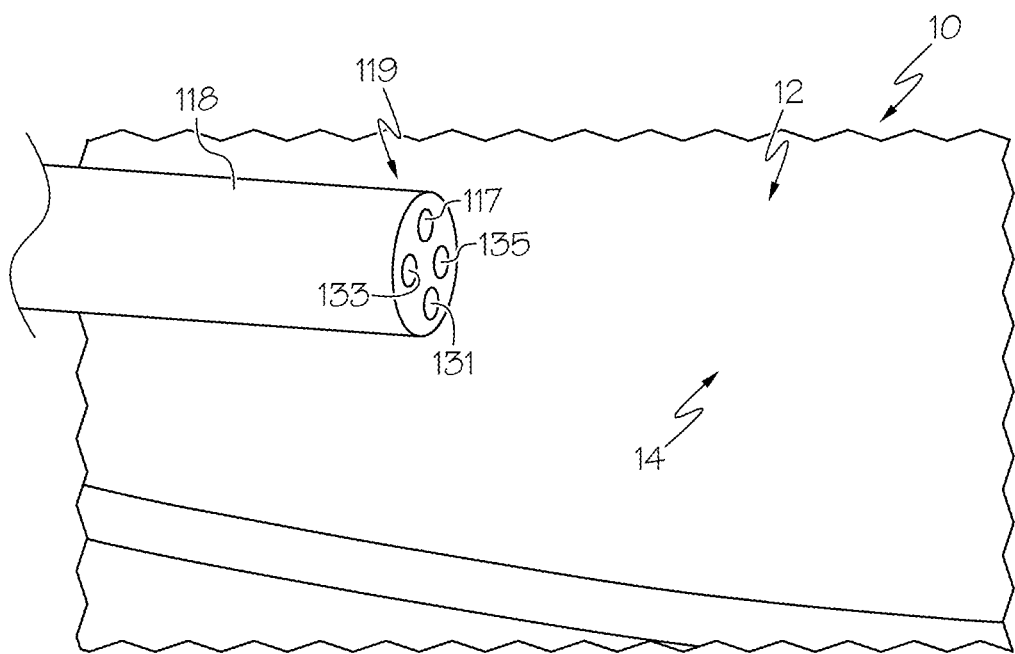
FIG. 2 is a partial perspective view of the medical system of FIG. 1 positioned at a target site of a patient, according to aspects of this disclosure.

Referring now to FIG. 2, distal end 126 of longitudinal body 124 is depicted within an anatomical lumen 10 of the subject. The anatomical lumen 10 may include various regions within the subject's body which may be under observation by medical system 100. The anatomical lumen 10 may be defined by at least a first (outer) region 12 and a second (central) region 14, with the first region 12 being positioned about an adjacent surrounding of the second region 14. Stated differently, the anatomical lumen 10 may be sized and/or shaped to have a generally narrow profile with the first region 12 defining a peripheral area around the second region 14.

With distal end 119 positioned within the anatomical lumen 10, first light 133 and second light 135 may be configured to emit light distally from distal end 119. First light 133 may be communicatively coupled to first light source 132, and second light 135 may be communicatively coupled to second light source 134. First light 133 may be configured to emit a broad light beam having a first emittance profile, and second light 135 may be configured to emit a narrow light beam having a second emittance profile that is different from the first emittance profile. In the embodiment, the first emittance profile is relatively greater (e.g., wider) than the second emittance profile. Stated differently, second light 135 may be operable to transmit light from second light source 134 that has a focused illumination profile that is narrower in size and/or shape than a light transmitted by first light 133 from first light source 132.

Still referring to FIG. 2, with distal end 119 positioned within the anatomical lumen 10, imaging sensor 131 may be configured to capture images of portions of the anatomical lumen 10 positioned distally of distal end 119. Imaging sensor 131 may be communicatively coupled to imaging device 130. Imaging sensor 131 may be adjacent one or more camera lenses. The data captured by imaging sensor 131 may be communicated by imaging device 130 to computing device 140, and saved in memory 144 as image data 148.

In some embodiments, the image data 148 generated by imaging device 130 may include processed images having a partial-resolution frame of pixel values that visually emphasize one or more features and/or characteristics of a luminal passageway within the subject, such as the anatomical lumen 10. It should be understood that imaging sensor 131 may include colored filter sensor arrays such that digital images captured by imaging sensor 131 may provide a raw image (e.g. image data 148) having various color pixel values arranged in a mosaic pattern. Each pixel array of the pattern may include a single color pixel value such that one or more color pixel values may be omitted thereon. Digital images generated by imaging device 130 may include a two-dimensional array of pixel values, with each pixel value corresponding to a light intensity in one of a plurality of spectral bands (e.g., color pixel values) at a particular pixel location in the captured image of the anatomical lumen 10.

Referring now to FIG. 3, a schematic of an image captured by imaging sensor 131 of the anatomical lumen 10 is shown. In some embodiments, medical system 100, and particularly computing device 140, may be configured to determine a location of first region 12 and second region 14 within the anatomical lumen 10 by identifying a boundary A defined between the regions 12, 14. In other words, the boundary A may define an interface area of the anatomical lumen 10 that is positioned between the regions 12, 14. It should be appreciated that the boundary A is depicted to serve as a visual reference for informational purposes only, and that second region 14 may substantially coincide within the boundary A while first region 12 may be generally positioned external to the boundary A.

Figure 4:
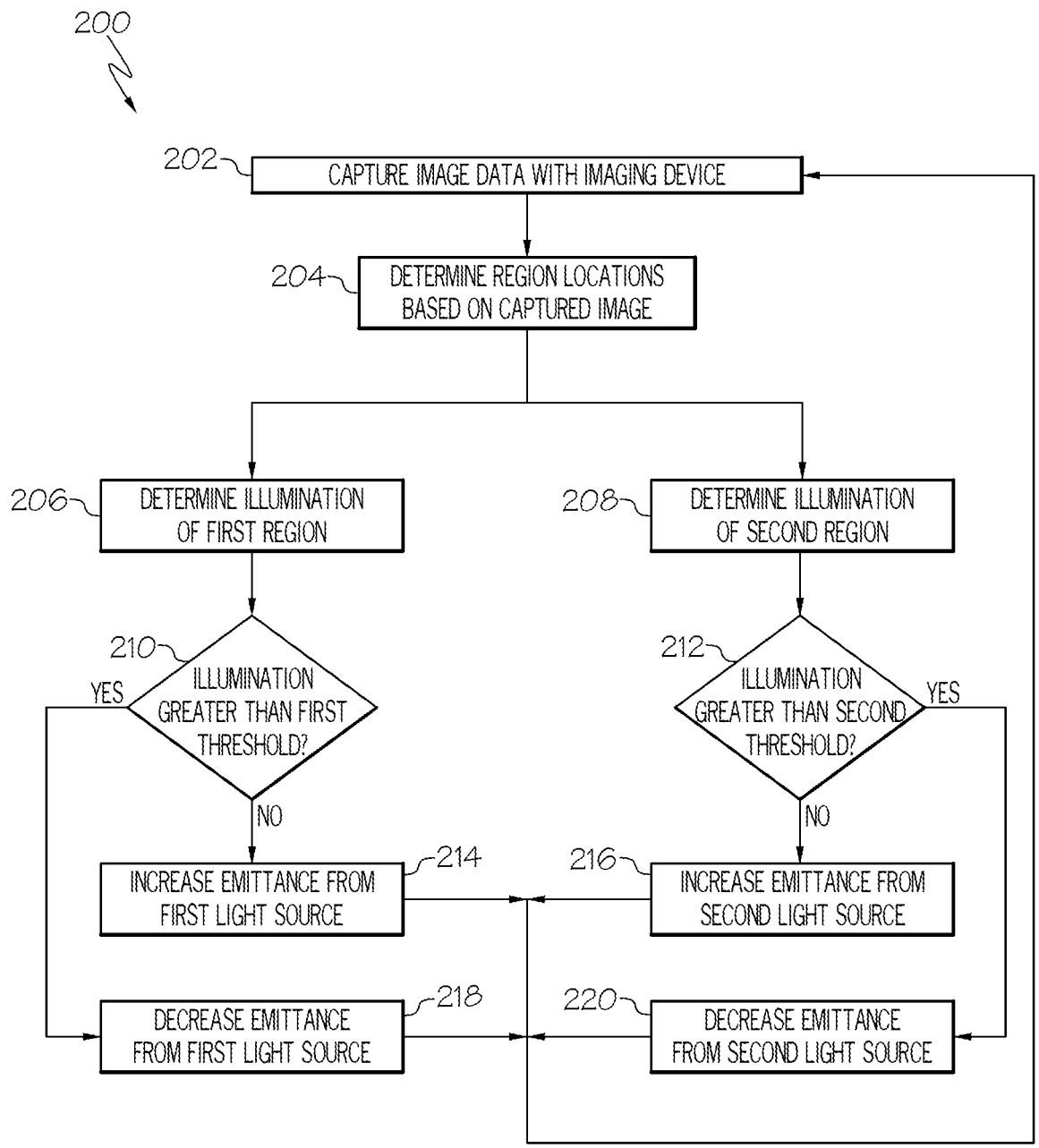
FIG. 4 is a block diagram of an exemplary method of illuminating a target site with the medical system of FIG. 1, according to aspects of this disclosure.

Referring now to FIGS. 1-3 in conjunction with the flow diagram of FIG. 4, an exemplary method 200 of using medical system 100 to illuminate a target treatment site (e.g. the anatomical lumen 10) is schematically depicted. The depiction of FIG. 4 and the accompanying description below is not meant to limit the subject matter described herein to a particular method.

Initially, medical device 110 may be inserted into a subject's body (not shown) to position distal end 119 adjacent to a target site, such as the anatomical lumen 10 (FIGS. 2-3). Shaft 118 may be guided through a digestive tract of the subject by inserting distal end 119 into a nose or mouth (or other suitable natural body orifice) of the subject's body and traversed through a gastrointestinal tract of the subject's body (e.g., an esophagus, a stomach, a small intestine, etc.) until reaching the anatomical lumen 10. It should be appreciated that a length of shaft 118 may be sufficient so that a proximal end of medical device 110 (including handle 112) is external of the subject while distal end 119 is internal to the subject's body. While this disclosure relates to the use of medical device 110 in a digestive tract of a subject, it should be understood that the features of this disclosure could be used in various other locations (e.g., other organs, tissue, etc.) within a subject's body.

With medical device 110 received within the subject's body, medical instrument 120 may be received within medical device 110 via the at least one port 116. Longitudinal body 124 may be translated through shaft 118, and particularly through at least one of the lumens of shaft 118 (e.g., a working lumen). Distal end 126 may extend distally from an opening at distal end 119, such as, for example, a working opening that is in communication with a working lumen of shaft 118. Accordingly, and as seen in FIG. 2, distal end 126 may be disposed within the anatomical lumen 10.

In some embodiments, at least a distal portion of shaft 118, including distal end 119, may be selectively articulated along an articulation joint of shaft 118. For example, handle 112 may be actuated to adjust a position, location, and/or orientation of distal end 119 relative to the anatomical lumen 10. Accordingly, a user may selectively orient imaging sensor 131, first light 133, and second light 135 (received through lumens of shaft 118) relative to the first region 12 and the second region 14.

With distal end 119 positioned within the anatomical lumen 10, imaging sensor 131, first light 133, and second light 135 may be utilized to facilitate a visual observation of the anatomical lumen 10 during a procedure. For example, first light 133 and second light 135 may be configured to transmit light distally from distal end 119. Imaging sensor 131 may be configured to detect, record, and capture image data of the anatomical lumen 10, facilitated by the illumination provided by first light 133 and second light 135.

Accordingly, and referring now to FIG. 4, a user may generate imaging (e.g. image data 148) of the tissue located therein with imaging device 130 for visualizing the anatomical lumen 10, and particularly a target treatment site within the anatomical lumen 10. For example, at step 202, processor 142 may execute one or more instructions in accordance with the illumination control logic 146 to capture images of the anatomical lumen 10 with imaging device 130. The image data 148 may be communicated to computing device 140, recorded on memory 144, and displayed on display 150 for real-time observation by a user of medical system 100.

At step 204, processor 142 may determine a location of each of the first region 12 and the second region 14 of the anatomical lumen 10 based on the image data 148. For example, processor 142 may determine a location of each region 12, 14 based on the size, shape, profile, and/or configuration of the anatomical lumen 10, as determined by the image data 148 detected by imaging sensor 131. Processor 142 may determine a location of the boundary A defining the interface area of the anatomical lumen 10 between first region 12 and second region 14. As described above, an area coinciding within the boundary A may generally be determined to include second region 14, while the area positioned outside of the boundary A may be indicative of first region 12.

At step 206, processor 142 may determine a first illumination measurement of the first region 12 by first light 133. At step 208, processor 142 may determine a second illumination measurement of the second region 14 by second light 135. In some embodiments, processor 142 may be configured to measure the amount of visible light (lumens) received on the surfaces (e.g. tissue walls) defining the regions 12, 14 of the anatomical lumen 10 based on the image data 148. A light intensity of first light source 132 and second light source 134 may be measured based on the raw pixel data (e.g. image data 148) captured by imaging sensor 131.

In one example, processor 142 may determine an average brightness value of each pixel positioned within the respective regions 12, 14 from the image data 148. In another example, processor 142 may determine a sum of the plurality of pixel values for each region 12, 14, and calculate the corresponding illumination measurement as a predefined percentage (e.g., about 10%, 20%, 30%, 40%, 50%, 60%, 70%, 80%, 90%, and more) of the summation. In further examples, processor 142 may determine the luminous flux emitted onto each of the first region 12 and the second region 14 via various other suitable processes without departing from a scope of this disclosure.

At step 210, processor 142 may determine whether the first illumination measurement (step 206) exceeds a first luminance threshold for first light source 132. At step 212, processor 142 may determine whether the second illumination measurement (step 208) exceeds a second luminance threshold for second light source 134. In some embodiments, the first luminance threshold may define a light intensity tolerance that is different than the second luminance threshold. For example, the first luminance threshold may correspond to a predefined minimum luminous intensity required to adequately illuminate the first region 12. The second luminance threshold may correspond to a predefined minimum luminous intensity required to adequately illuminate the second region 14.

In some examples, the predefined luminance thresholds may be based on a predefined saturation percentage determined from the image data 148. In this instance, the predefined saturation percentage may range from about 30% to about 60% of the light intensity captured in the plurality of pixels positioned within each region 12, 14 from the image data 148. In other embodiments, one or more of the luminance thresholds may be modified by computing device 140 and/or a user of medical system 100 (e.g. via display 150). For example, processor 142 may selectively adjust the first and/or second luminance threshold automatically based on a detected size, shape, profile, and/or configuration of the anatomical lumen 10, and particularly the first region 12 and the second region 14, based on the image data 148 detected by imaging device 130.

In response to determining that the first illumination measurement exceeds the first luminance threshold at step 210, processor 142 may decrease an emittance of light from first light source 132 at step 218. In some embodiments, processor 142 may determine a variance between the first illumination measurement and the first luminance threshold (e.g. measured in candela), and decrease the light emittance from first light source 132 by the variance.

In other embodiments, processor 142 may control first light 133 by reducing the emittance of light from first light source 132 by a predetermined (negative) luminous intensity variable. In this instance, the predetermined (negative) luminous intensity variable may include a fixed (static) parameter used to automatically decrease a light emittance from first light source 132 irrespective of the first illumination measurement of the first region 12.

Alternatively, in response to determining that the first illumination measurement does not exceed the first luminance threshold at step 210, processor 142 may increase an emittance of light from first light source 132 at step 214. Processor 142 may increase the light emittance by determining a variance between the first illumination measurement and the first luminance threshold and increasing the light emittance from first light source 132 by the variance. Alternatively, processor 142 may increase the emittance of light by a predetermined (positive) luminous intensity variable (e.g. a fixed (static) parameter) automatically irrespective of the first illumination measurement of the first region 12.

In response to determining that the second illumination measurement exceeds the second luminance threshold at step 212, processor 142 may decrease an emittance of light from second light source 134 at step 220 in a manner similar to first light source 132 described above at step 218 (e.g., a variance, a predetermined (negative) luminous intensity variable, etc.). Alternatively, in response to determining that the second illumination measurement does not exceed the second luminance threshold at step 212, processor 142 may increase an emittance of light from second light source 134 at step 216 in a manner similar to first light source 132 described above at step 214 (e.g., a variance, a predetermined (positive) luminous intensity variable, etc.). Accordingly, it should be understood that an illumination of the anatomical lumen 10 by light sources 132, 134 may be automatically determined in real-time by a current visibility condition of each region 12, 14.

Processor 142 may return to step 202 upon increasing (steps 214 and 216) and/or decreasing (steps 218 and 220) the emittance of light from first light source 132 and/or second light source 134, respectively. In this instance, in executing the one or more instructions of the illumination control logic 146, processor 142 may periodically (or continuously) execute method 200 by recapturing image data 148 with imaging device 130 at a plurality of periods (or continuously). In some embodiments, processor 142 may repeat execution of the illumination control logic 146 at predefined intervals, while in other embodiments processor 142 may continuously repeat the steps described herein during continued active use of medical system 100. In other embodiments, processor 142 may cease execution of method 200 upon determining that the first illumination measurement and/or the second illumination measurement equals the first luminance threshold and/or the second luminance threshold, respectively.

Figure 5:
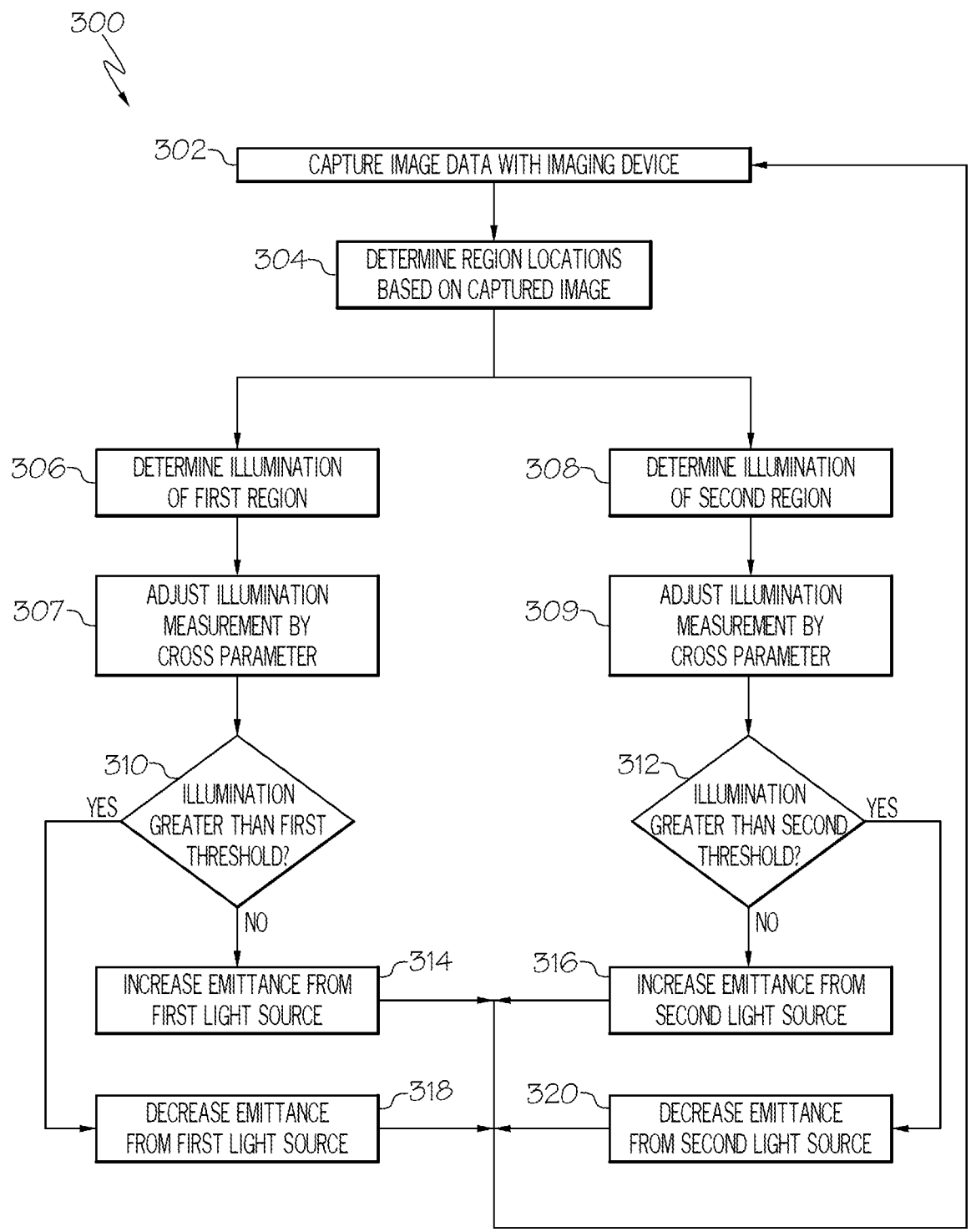
FIG. 5 is a block diagram of an exemplary method of illuminating a target site with the medical system of FIG. 1, according to aspects of this disclosure.

Referring now to FIG. 5, another exemplary method 300 of using medical system 100 to illuminate a target treatment site (e.g. the anatomical lumen 10) is schematically depicted. The depiction of FIG. 5 and the accompanying description below is not meant to limit the subject matter described herein to a particular method. Except as otherwise described below, one or more of the steps of method 300 may be similar to method 200 shown and described above. For example, processor 142 may be configured to capture image data 148 (step 302) and determine a corresponding location of each region 12, 14 within the anatomical lumen 10 based on the image data 148 (step 304) in a manner similar to that described above in method 200. Additionally, processor 142 may determine a first illumination measurement of the first region 12 (step 306) and a second illumination measurement of the second region 14 (step 308) similar to steps 206 and 208, respectively.

At step 307, processor 142 may execute one or more instructions in accordance with the illumination control logic 146 to adjust the first illumination measurement (step 306) by a first cross-term parameter. At step 309, processor 142 may adjust the second illumination measurement (step 308) by a second cross-term parameter. The first cross-term parameter may be the same and/or different than the second cross-term parameter. The cross-term parameter(s) may include a weighted variable that takes into consideration at least a portion of the brightness intensity present in the other region 12,14 when calculating a final (adjusted) illumination measurement for each region 12, 14.

Processor 142 may adjust the first illumination measurement by the cross-term parameter at step 307 to account for a brightness of the second region 14 at least partially influencing an overall brightness of the first region 12. Further, processor 142 may adjust the second illumination measurement by the cross-term parameter at step 309 to account for a brightness of the first region 12 at least partially influencing an overall brightness of the second region 14.

In other words, given that the first region 12 is positioned adjacent to the second region 14, and vice versa, processor 142 may incorporate the cross-term parameter to adjust the first illumination measurement (step 307) and the second illumination measurement (step 309) to factor in a brightness effect contributed by each light source 132, 134 to the other region 12, 14 (that the corresponding light 133, 135 is not directed toward). In some embodiments, the cross-term parameter may be a predefined fixed variable indicative of a minimum degree of influence that each light source 132, 134 may have on the other region 12, 14. In other embodiments, the cross-term parameter may be a percentage of the brightness measured at the opposing region 12, 14. By way of example, the cross-term parameter may range from a value of about 0 to about 1, wherein values proximate to 0 may be indicative of minimal to no coupling between the adjacent regions 12, 14 (i.e. the brightness of each region does not have a contributory influence on the opposing region) and values proximate to 1 may be indicative of maximum to complete coupling between the adjacent regions 12, 14 (i.e. the brightness of each region has a contributory influence on the opposing region).

In other embodiments, the cross-term parameter may be a dynamic variable that is automatically determined by processor 142 based on one or more characteristics of the anatomical lumen 10, such as within each of the first region 12 and the second region 14. In this instance, processor 142 may automatically adjust the cross-term parameter based on an illumination condition of each region 12, 14. For example, processor 142 may determine the cross-term parameter as a function of a corresponding percentage of the illumination measurement of the opposing region 12, 14, such as a percentage ranging from about 10% to about 90%.

In other examples, processor 142 may determine the cross-term parameter as a function of an illumination measurement of a spatial sub-region of the opposing region 12, 14, such as a sub-region ranging from about 10% to about 90% of the total area of the opposing region 12, 14. In this instance, an illumination measurement of a plurality of pixels located within the sub-region of the opposing region 12, 14 may be determined and incorporated into the final (adjusted) illumination measurement for each region 12, 14 in the form of the cross-term parameter.

In further examples, processor 142 may determine the cross-term parameter based on one or more processes, including but not limited to, a frequency distribution (e.g., a histogram analysis) of all of the plurality of pixel values within each region 12, 14. In this instance, processor 142 may determine the cross-term parameter based on an average mean of the plurality of pixel values, a median pixel value, a mode of the plurality of pixel values, and more. In other instances, a histogram analysis of the plurality of pixel values from the regions 12, 14 may be fit to two or more Gaussian curves (e.g. a normal bell-curve distribution). In this instance, the cross-term parameter may be determined (and adjusted) based on an amplitude and/or a width of the Gaussian curves relative to one another. By way of example, processor 142 may calculate a relatively low cross-term parameter when the histogram analysis results in a first Gaussian curve representing high intensity values to have a high amplitude and a small (narrow) width relative to a second Gaussian curve representing low intensity values. By way of further example, processor 142 may calculate a relatively high cross-term parameter when the histogram analysis results in a first Gaussian curve representing high intensity values to have a low amplitude and a large (wide) width relative to a second Gaussian curve representing low intensity values.

By way of example, in response to determining that a local pixel value within one of the respective regions 12, 14 includes an outlier illumination intensity (e.g. a targeted bright spot and/or a local dark spot), processor 142 may configure the cross-term parameter to mitigate an excessive impact of the outlier measurement on the adjustment of the illumination measurements (steps 307 and 309). Accordingly, processor 142 may automatically adjust the first illumination measurement by the first cross-term parameter (step 307) to determine the final (adjusted) first illumination measurement, and automatically adjust the second illumination measurement by the second cross-term parameter (step 309) to determine the final (adjusted) second illumination measurement.

At step 310, processor 142 may determine whether the final (adjusted) first illumination measurement (step 307) exceeds a first luminance threshold for first light source 132 in a manner similar to step 210 described above. At step 312, processor 142 may determine whether the final (adjusted) second illumination measurement (step 309) exceeds a second luminance threshold for second light source 134 in a manner similar to step 212 described above.

In response to determining that the final (adjusted) first illumination measurement exceeds the first luminance threshold at step 310, processor 142 may decrease an emittance of light from first light source 132 at step 318 (similar to step 218). Alternatively, in response to determining that the final (adjusted) first illumination measurement does not exceed the first luminance threshold at step 310, processor 142 may increase an emittance of light from first light source 132 at step 314 (similar to step 214).

In response to determining that the final (adjusted) second illumination measurement exceeds the second luminance threshold at step 312, processor 142 may decrease an emittance of light from second light source 134 at step 320 (similar to step 220). Alternatively, in response to determining that the final (adjusted) second illumination measurement does not exceed the second luminance threshold at step 312, processor 142 may increase an emittance of light from second light source 134 at step 316 (similar to step 216). Accordingly, it should be understood that an illumination of anatomical lumen 10 by light sources 132, 134 may be automatically determined in real-time by a current visibility condition of each region 12, 14.

Processor 142 may return to step 302 upon increasing (steps 314 and 316) and/or decreasing (steps 318 and 320) the emittance of light from first light source 132 and/or second light source 134, respectively. In this instance, in executing the one or more instructions of the illumination control logic 146, processor 142 may periodically (or continuously) execute method 300 by recapturing image data 148 with imaging device 130 at a plurality of periods, at predefined intervals, and/or continuously during continued use of medical system 100 in a procedure. In other embodiments, processor 142 may cease execution of method 300 upon determining that the first illumination measurement and/or the second illumination measurement equals the first luminance threshold and/or the second luminance threshold, respectively.

Figure 6:
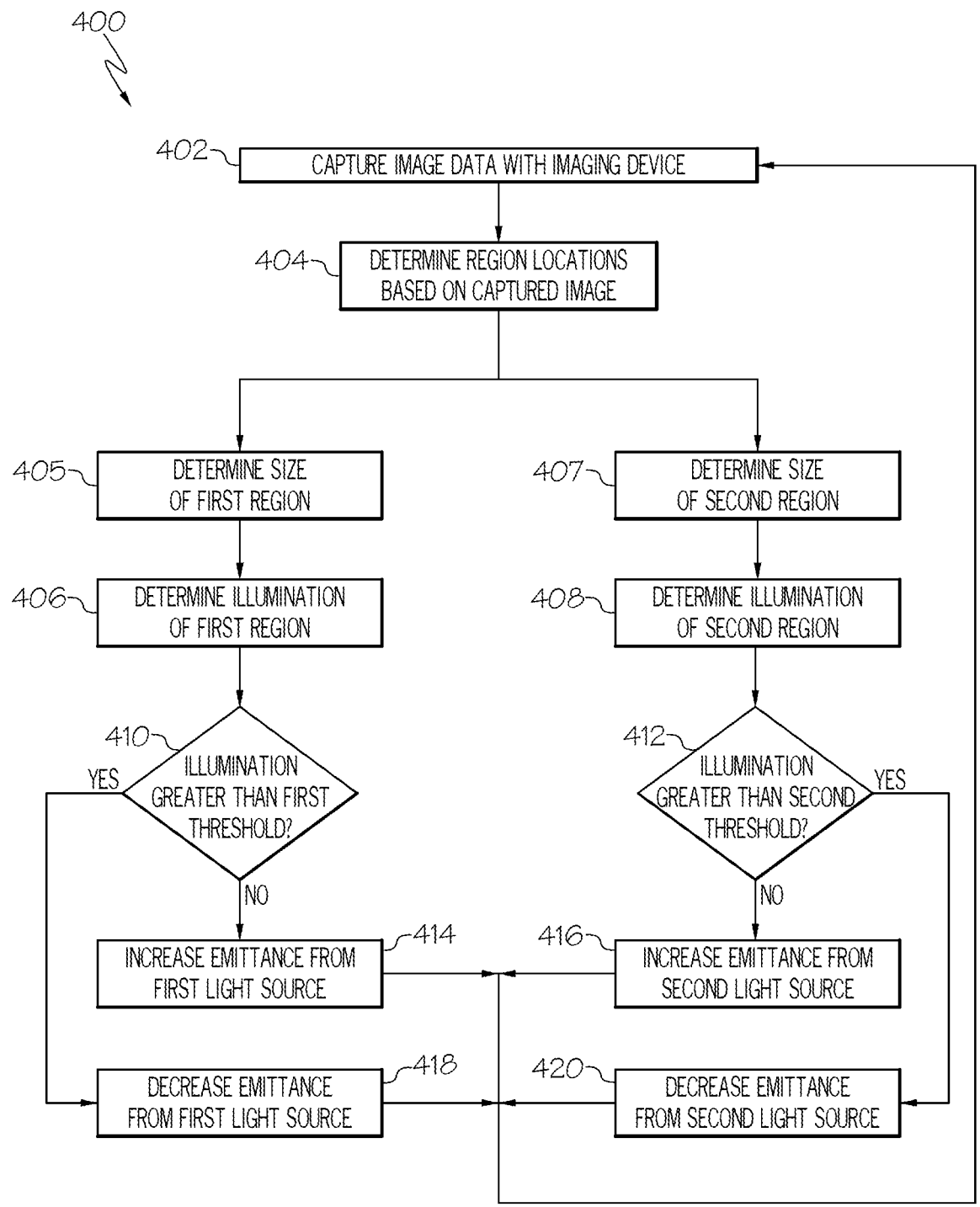
FIG. 6 is a block diagram of an exemplary method of illuminating a target site with the medical system of FIG. 1, according to aspects of this disclosure.

Referring now to FIG. 6, another exemplary method 400 of using medical system 100 to illuminate a target treatment site (e.g. the anatomical lumen 10) is schematically depicted. The depiction of FIG. 6 and the accompanying description below is not meant to limit the subject matter described herein to a particular method. Except as otherwise described below, one or more of the steps of method 400 may be similar to methods 200, 300 shown and described above. For example, processor 142 may be configured to capture image data 148 (step 402) and determine a corresponding location of each region 12, 14 within the anatomical lumen 10 based on the image data 148 (step 404) in a manner similar to method 200 described above.

At step 405, processor 142 may execute one or more instructions in accordance with the illumination control logic 146 to determine an area and/or size of the first region 12 within the anatomical lumen 10 based on the image data 148. At step 407, processor 142 may determine an area and/or size of the second region 14 within the anatomical lumen 10 based on the image data 148. An area and/or size of the first region 12 and the second region 14 may be indicative of the distribution of light by the corresponding first light 133 and second light 135, respectively, that is received in each region 12, 14. Stated differently, the size of each region 12, 14 may determine a concentration of luminance from each light source 132, 134 that is transmitted onto each respective region 12, 14 of the anatomical lumen 10.

For example, regions 12, 14 having a relatively narrow size and/or profile may receive a greater distribution of light by the respective light 133, 135 directed toward the other region 12, 14, such that an illumination measurement within said region 12, 14 may be relatively greater than another region 12, 14 having a relatively wider size and/or profile. Stated differently, processor 142 may determine that a region 12, 14 having a relatively smaller size may result in the other light source 132, 134 (which is not directed toward illuminating said region 12, 14) having a greater contribution to the overall illumination of said region 12, 14 given its narrow profile.

In contrast, processor 142 may determine that a region 12, 14 having a relatively greater size may result in the other light source 132, 134 (which is not directed toward illuminating said region 12, 14) having a minimal contribution to the overall illumination of said region 12, 14 given its wide profile. Processor 142 may consider various dimensional characteristics of the anatomical lumen 10 when determining a size of each region 12, 14, such as a depth, a width, a height, a shape, etc. In some embodiments, pixel values exhibiting a sharp contrast within the captured image (image data 148) may correspond to pixel locations defining a perimeter boundary of the regions 12, 14.

In further examples, processor 142 may determine the size of each region 12, 14 based on one or more processes, including but not limited to, a frequency distribution (e.g., a histogram analysis) of the plurality of pixel values within each region 12, 14. In this instance, processor 142 may determine the prevalence and depth of each of the regions 12, 14 in the anatomical lumen 10. In one embodiment, the size of each region 12, 14 may be determined based on a surface plot or gradient of the resulting intensity in each region 12, 14. In this instance, relatively rapid changes in the intensity within one of the regions 12, 14 may be indicative of a location of a boundary of the corresponding region 12, 14 where the influence of a secondary light source (e.g. from the other region) may taper off. Accordingly, processor 142 may automatically adjust the size of the first region 12 at step 405, and of the second region 14 at step 407, based on the image data 148 captured by imaging sensor 131.

At step 406, processor 142 may determine the first illumination measurement of the first region 12 based on the determined size of the first region 12 (step 405), similar to step 206 described above. At step 408, processor 142 may determine the second illumination measurement of the second region 14 based on the determined size of the second region 14 (step 407), similar to step 208 described above.

In some embodiments, in determining the size of each region 12, 14, processor 142 may factor an influence of second light 135 on the first region 12 when determining the first illumination measurement of the first region 12 by utilizing a first cross-term parameter, as described above at step 307. Further, processor 142 may account for an illumination overlap by the first light 133 on the second region 14 when determining the second illumination measurement of the second region 14 by utilizing a second cross-term parameter, as described above at step 309.

For example, in response to determining that the anatomical lumen 10 has a relatively narrow second region 14 based on the image data 148, processor 142 may account for a greater contribution by second light 135 to an illumination of the first region 12 by adjusting the first illumination measurement with the first cross-term parameter. Alternatively, in response to determining that the anatomical lumen 10 has a relatively wide second region 14, processor 142 may determine that second light 135 provides minimal illumination of the first region 12 when adjusting the first illumination measurement with the first cross-term parameter.

By way of further example, in response to determining that the anatomical lumen 10 has a relatively narrow first region 12, processor 142 may account for a greater contribution by first light 133 to an illumination of the second region 14 by adjusting the second illumination measurement with the second cross-term parameter. Alternatively, in response to determining that the anatomical lumen 10 has a relatively wide first region 12, processor 142 may determine that first light 133 provides minimal illumination of the second region 14 when adjusting the second illumination measurement with the second cross-term parameter.

At step 410, processor 142 may determine whether the first illumination measurement (step 406) exceeds a first luminance threshold for first light source 132 in a manner similar to step 210 described above. At step 412, processor 142 may determine whether the second illumination measurement (step 408) exceeds a second luminance threshold for second light source 134 in a manner similar to step 212 described above. In response to determining that the first illumination measurement exceeds the first luminance threshold at step 410, processor 142 may decrease an emittance of light from first light source 132 at step 418. Alternatively, in response to determining that the first illumination measurement does not exceed the first luminance threshold at step 410, processor 142 may increase an emittance of light from first light source 132 at step 414.

In response to determining that the second illumination measurement exceeds the second luminance threshold at step 412, processor 142 may decrease an emittance of light from second light source 134 at step 420. Alternatively, in response to determining that the second illumination measurement does not exceed the second luminance threshold at step 412, processor 142 may increase an emittance of light from second light source 134 at step 416. Accordingly, it should be understood that an illumination of anatomical lumen 10 by light sources 132, 134 may be automatically determined in real-time by a current visibility condition of each region 12, 14.

Processor 142 may return to step 402 upon increasing (steps 414 and 416) and/or decreasing (steps 418 and 420) the emittance of light from first light source 132 and/or second light source 134, respectively. In this instance, in executing the one or more instructions of the illumination control logic 146, processor 142 may periodically (or continuously) execute method 400 by recapturing image data 148 with imaging device 130 at a plurality of periods, at predefined intervals, and/or continuously during active use of medical system 100. In other embodiments, processor 142 may cease execution of method 400 upon determining that the first illumination measurement and/or the second illumination measurement equals the first luminance threshold and/or the second luminance threshold, respectively.

Each of the aforementioned systems, devices, assemblies, and methods may be used to detect, measure, and illuminate a location of a target site. By providing a medical system including a computing device that automatically controls an illumination output of a plurality of lighting devices, a user may have optimal visibility within a subject's body during a procedure, allowing a user to reduce overall procedure time, increase efficiency of procedures, and avoid unnecessary harm to a subject's body caused by poor visibility in a target treatment site. The aforementioned methods may be further used to train algorithms for application by one or more automated machines, in the form of artificial intelligence, that are configured and operable to simulate the processes of the aforementioned systems and devices without requiring user intervention.

It will be apparent to those skilled in the art that various modifications and variations may be made in the disclosed devices and methods without departing from the scope of the disclosure. It should be appreciated that the disclosed devices may include various suitable computer systems and/or computing units incorporating a plurality of hardware components, such as, for example, a processor and non-transitory computer-readable medium that allow the devices to perform one or more operations during a procedure in accordance with those described herein. Other aspects of the disclosure will be apparent to those skilled in the art from consideration of the specification and practice of the features disclosed herein. It is intended that the specification and examples be considered as exemplary only.

It should be appreciated that the various systems may include any computing device. The computing device may include input and output ports to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

In one embodiment, any of the disclosed systems, methods, and/or graphical user interfaces may be executed by or implemented by a computing system consistent with or similar to the descriptions herein. Although not required, aspects of this disclosure are described in the context of computer-executable instructions, such as routines executed by a data processing device, e.g., a server computer, wireless device, and/or personal computer. Those skilled in the relevant art will appreciate that aspects of this disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "computing device," and the like, are generally used interchangeably herein, and refer to any of the above devices and systems, as well as any data processor.

Aspects of this disclosure may be embodied in a special purpose computer and/or data processor that is specifically programmed, configured, and/or constructed to perform one or more of the computer-executable instructions explained in detail herein. While aspects of this disclosure, such as certain functions, are described as being performed exclusively on a single device, this disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of this disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of this disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

It will be apparent to those skilled in the art that various modifications and variations can be made to the disclosed system, methods, and devices without departing from the scope of the disclosure. Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

We claim:

1. A medical system, comprising:
   a shaft having a distal end configured to be positioned at a target site;
   a first light positioned at the distal end and having a first beam profile;
   a second light positioned at the distal end and having a second beam profile; and
   a computing device communicatively coupled to the first light and the second light, wherein the computing device includes a processor and non-transitory computer readable medium storing instructions that, when executed by the processor, cause the processor to:
   (i) determine a first illumination measurement of a first region of the target site by the first light, wherein the first beam profile of the first light is different from, and causes a broader emittance of the first light onto the target site, than the second beam profile of the second light;
   (ii) determine a second illumination measurement of a second region of the target site by the second light, wherein the second region is different than the first region;
   (iii) adjust emittance from the first light in response to the first illumination measurement of the first region being different than a first threshold; and
   (iv) adjust emittance from the second light in response to the second illumination measurement of the second region being different than a second threshold.

2. The medical system of claim 1, wherein the instructions stored in the non-transitory computer readable medium cause the processor to:
increase the emittance from the first light when the first illumination measurement of the first region is less than the first threshold, and decrease the emittance from the first light when the first illumination measurement of the first region is greater than the first threshold.

3. The medical system of claim 1, wherein the instructions stored in the non-transitory computer readable medium cause the processor to:
increase the emittance from the second light when the second illumination measurement of the second region is less than the second threshold, and decrease the emittance from the second light when the second illumination measurement of the second region is greater than the second threshold.

4. The medical system of claim 1, further comprising an imaging device positioned at the distal end, the imaging device configured to capture image data of the first region and the second region of the target site.

5. The medical system of claim 4, wherein the computing device is communicatively coupled to the imaging device, and the instructions stored in the non-transitory computer readable medium cause the processor to:
determine a first location of the first region of the target site and a second location of the second region of the target site relative to the distal end based on the image data captured by the imaging device.

6. The medical system of claim 5, wherein the instructions stored in the non-transitory computer readable medium cause the processor to:
determine the first illumination measurement of the first region based on the image data captured by the imaging device at the first location; and
determine the second illumination measurement of the second region based on the image data captured by the imaging device at the second location.

7. The medical system of claim 6, wherein the instructions stored in the non-transitory computer readable medium cause the processor to:
determine the first illumination measurement of the first region by calculating an average brightness of a plurality of pixels from the image data captured by the imaging device.

8. The medical system of claim 4, wherein the instructions stored in the non-transitory computer readable medium cause the processor to:
adjust the first illumination measurement of the first region based on a first cross-term parameter indicative of illumination of the first region by the second light; and
adjust the second illumination measurement of the second region based on a second cross-term parameter indicative of illumination of the second region by the first light.

9. The medical system of claim 8, wherein each of the first cross-term parameter and the second cross-term parameter includes a predefined variable stored on the computing device.

10. The medical system of claim 8, wherein each of the first cross-term parameter and the second cross-term parameter includes a dynamic variable that is automatically adjusted by the computing device based on the image data captured by the imaging device.

11. The medical system of claim 10, wherein the instructions stored in the non-transitory computer readable medium cause the processor to:
modify each of the first cross-term parameter and the second cross-term parameter based on a frequency distribution of a plurality of pixels from the image data captured by the imaging device.

12. The medical system of claim 11, wherein the instructions stored in the non-transitory computer readable medium cause the processor to:
determine an area of the first region and an area of the second region of the target site based on the image data captured by the imaging device.

13. The medical system of claim 12, wherein the instructions stored in the non-transitory computer readable medium cause the processor to:
determine the first illumination measurement of the first region by the first light and the second light at least partially based on the area of the first region; and
determine the second illumination measurement of the second region by the second light and the first light at least partially based on the area of the second region.

14. The medical system of claim 4, wherein the instructions stored in the non-transitory computer readable medium cause the processor to:
periodically determine the first illumination measurement of the first region and the second illumination measurement of the second region with the imaging device after adjusting emittance from the first light and the second light.

15. The medical system of claim 1, wherein, based on the first beam profile of the first light and the second beam profile of the second light, the second region includes a central area of the target site relative to the distal end and the first region includes a periphery area of the target site surrounding the central area.

16. A method of illuminating a target site with a medical system, the method comprising:
determining a first location of a first region and a second location of a second region of the target site relative to the medical system;
determining a first illumination measurement of the first region by a first light of the medical system directed toward the first region;
determining a second illumination measurement of the second region by a second light of the medical system directed toward the second region, the second region being different than the first region; determining a first illumination factor contributed to the first region by the second light not directed toward the first region;
determining a second illumination factor contributed to the second region by the first light not directed toward the second region; and
adjusting emittance of one or more of the first light or the second light in response to the first illumination measurement, adjusted by the first illumination factor, or the second illumination measurement, adjusted by the second illumination factor, varying from a threshold.

17. The method of claim 16, further comprising:
capturing image data of the target site with an imaging device of the medical system, such that determining the first location of the first region and the second location of the second region is based on the image data captured by the imaging device.

18. The method of claim 16, further comprising:
capturing image data of the target site with an imaging device of the medical system, such that determining the first illumination measurement and the second illumination measurement is based on the image data captured by the imaging device.

19. The method of claim 16, further comprising:
determining a first size of the first region and a second size of the second region based on image data of the target site captured with an imaging device of the medical system, wherein the first size of the first region and the second size of the second region is indicative of a distribution of light by the first light and the second light onto each of the first region and the second region;
determining the first illumination measurement of the first region by the first light and the first illumination factor contributed to the first region by the second light based in part on the first size of the first region; and
determining the second illumination measurement of the second region by the second light and the second illumination factor contributed to the second region by the first light based in part on the second size of the second region.

20. A method of illuminating a target site with a medical system, the method comprising:
(a) capturing image data of the target site with an imaging device of the medical system as first light, from a first light source of the medical system, is directed toward a first region of the target site and second light, from a second light source of the medical system, is directed toward a second region of the target site;
(b) determining a location of the first region and a location of the second region of the target site relative to the medical system;
(c) determining a size of the first region and a size of the second region based on the image data;
(d) determining a first illumination measurement of the first region, including an illumination of the first region by the first light and a contributory illumination of the first region by the second light, based on the location of the first region and the size of the first region;
(e) determining a second illumination measurement of the second region, including an illumination of the second region by the second light and a contributory illumination of the second region by the first light, based on the location of the second region and the size of the second region;
(f) comparing each of the first illumination measurement and the second illumination measurement to a respective threshold;
(g) adjusting emittance of one or more of the first light or the second light in response to the respective first illumination measurement or the second illumination measurement varying from the respective threshold; and
(h) repeating steps (a) through (g) at a periodic interval until the first illumination measurement and the second illumination measurement is determined to equal the respective threshold at step (f).

* * * * *